United States Patent
Viladrich et al.

(10) Patent No.: US 10,273,878 B2
(45) Date of Patent: Apr. 30, 2019

(54) RIGID PRESS-FIT CAP FOR MOTOR VEHICLES

(71) Applicant: DAYCO EUROPE S.R.L., Chieti (IT)

(72) Inventors: Jordi Viladrich, Chieti (IT); Gianluca Perfetti, Chieti (IT); Stefan Brandin, Wolsburg (DE)

(73) Assignee: Dayco Europe S.R.L., Chieti (IT)

( * ) Notice: Subject to any disclaimer, the term of this patent is extended or adjusted under 35 U.S.C. 154(b) by 0 days.

(21) Appl. No.: 14/911,754

(22) PCT Filed: Aug. 12, 2014

(86) PCT No.: PCT/IB2014/063879
§ 371 (c)(1),
(2) Date: Feb. 12, 2016

(87) PCT Pub. No.: WO2015/022642
PCT Pub. Date: Feb. 19, 2015

(65) Prior Publication Data
US 2016/0186653 A1 Jun. 30, 2016

(30) Foreign Application Priority Data
Aug. 12, 2013 (IT) .............................. TO2013A0686

(51) Int. Cl.
*F02B 77/00* (2006.01)
*B32B 15/088* (2006.01)
(Continued)

(52) U.S. Cl.
CPC .............. *F02B 77/005* (2013.01); *B05D 1/18* (2013.01); *B32B 15/088* (2013.01); *B32B 15/18* (2013.01);
(Continued)

(58) Field of Classification Search
CPC ....... F02B 77/005; B05D 1/18; B32B 15/088; B32B 15/20; B32B 27/34; B32B 2307/306; B32B 2307/714; B32B 2605/00
See application file for complete search history.

(56) References Cited

U.S. PATENT DOCUMENTS 3,635,369 A * 1/1972 Lasswell ............... F02B 77/005
220/378
3,889,841 A * 6/1975 Edmonds ................ F01P 11/20
123/41.15
(Continued)

FOREIGN PATENT DOCUMENTS

EP 2299089 A1 3/2011

OTHER PUBLICATIONS

PCT, International Search Report and Written Opinion, International Application No. PCT/IB2014/063879, dated Dec. 18, 2014.
(Continued)

*Primary Examiner* — Syed O Hasan
(74) *Attorney, Agent, or Firm* — FisherBroyles, LLP; Susan M. Oiler

(57) ABSTRACT

A rigid cap is provided for a motor vehicle, in particular, for the engine of a motor vehicle. The rigid cap has a first layer made of a metal material and at least a second layer comprising polyamide 11. Preferably, the second layer is made entirely of polyamide 11 and, even more preferably, entirely covers the first layer. The cap may be a press-fit cap or a threaded cap.

12 Claims, 2 Drawing Sheets

(51) Int. Cl.
*B32B 15/18* (2006.01)
*B32B 15/20* (2006.01)
*B32B 27/34* (2006.01)
*B05D 1/18* (2006.01)

(52) U.S. Cl.
CPC .............. *B32B 15/20* (2013.01); *B32B 27/34* (2013.01); *B32B 2307/306* (2013.01); *B32B 2307/714* (2013.01); *B32B 2605/00* (2013.01)

(56) References Cited

U.S. PATENT DOCUMENTS

| | | | |
|---|---|---|---|
| 4,048,366 A * | 9/1977 | Kingsbury | D06N 5/00 428/215 |
| 4,750,457 A | 6/1988 | Bonutti | |
| 5,622,745 A * | 4/1997 | Sloan | A61J 1/18 427/2.1 |
| 2009/0176923 A1* | 7/2009 | Fujii | C08J 5/043 524/494 |

OTHER PUBLICATIONS

Office Action dated Nov. 16, 2017 in Chinese Patent Application No. 2014800550550 (8 pages, including English translation).

* cited by examiner

RIGID PRESS-FIT CAP FOR MOTOR VEHICLES

CROSS-REFERENCE TO RELATED APPLICATIONS

This application is a National Stage filing of International Application No. PCT/IB2014/063879, filed Aug. 12, 2014, which claims priority of Italian Application No. TO2013A000686, filed Aug. 12, 2013, which are incorporated herein by reference in their entireties.

TECHNICAL FIELD

The present invention relates to a rigid press-fit cap for a motor vehicle, in particular for the engine of a motor vehicle.

STATE OF THE PRIOR ART

It is known to employ rigid press-fit caps in motor vehicles, especially for sealing the engine crankcase. These caps must only be removed in the event of emergencies or operations on the drive shafts.

Rigid press-fit caps are generally made of a metal material to ensure hermetic sealing of the engine crankcase. Nowadays, commercially available caps must ensure a fluid-tight seal and, in particular, against engine oil and the air/oil mixture present inside the engine at high temperatures. The engine caps currently used must also resist high pressures up to at least 2 bar, support considerable thermal shock and be resistant to temperatures varying from below −25° C. to more than 125° C., with peaks of even 145-155° C.

Thus, only metal caps are used to that end. To ensure a fluid-tight seal, it is also known to cover the caps with glue.

However, currently existing caps, even those where the metal is covered in glue, have numerous drawbacks. In particular, the metal material does not have the necessary resistance to chemical agents. For this reason, covering glues or paints are used, which are applied when the cap is mounted. However, the assembly line gluing process entails numerous drawbacks and, in particular, may result in caps being only partially covered and so, as a rule, the quality of the gluing is checked via an air tightness test. In consequence, the entire process becomes slow and expensive. In addition, it is also possible that cap leakage can occur over time due to incomplete gluing. Even by opportunely selecting the most appropriate adhesive materials, it is not possible to improve this situation and alternatives are thus sought that enable more rapid assembly combined with optimal sealing.

Caps are thus being sought that are devoid of the aforementioned drawbacks.

SUBJECT OF THE INVENTION

A first object of the present invention is therefore that of providing a rigid press-fit cap for motor vehicles that enables the aforementioned problems to be solved and that, at the same time, has a simple structure that is inexpensive to manufacture and has optimal resistance at low and high temperatures and which resists to pressure and chemical agents, especially engine oil.

According to the present invention, this object is achieved by a rigid press-fit cap for motor vehicles according to claim 1.

BRIEF DESCRIPTION OF DRAWINGS

For a better understanding of the present invention, it will now be described with reference to the accompanying figures, where.

DETAILED DESCRIPTION

Figure 2:
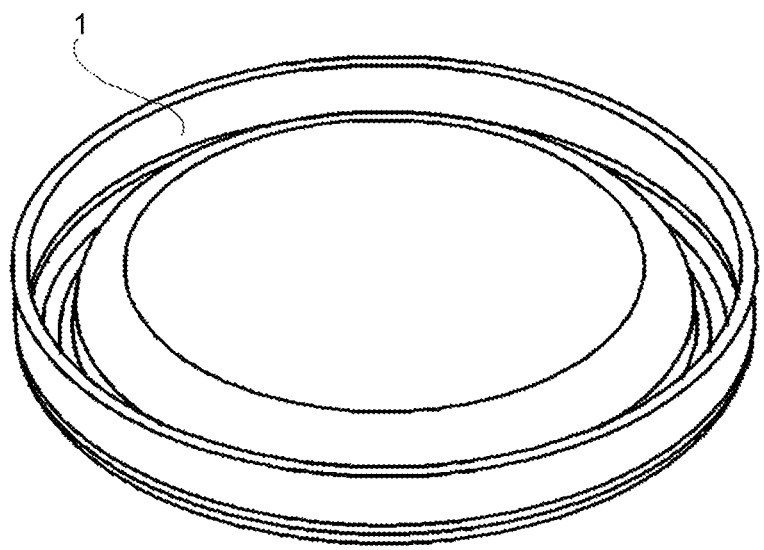
FIG. 2 is a perspective view of a cap according to the present invention.
Figure 3:
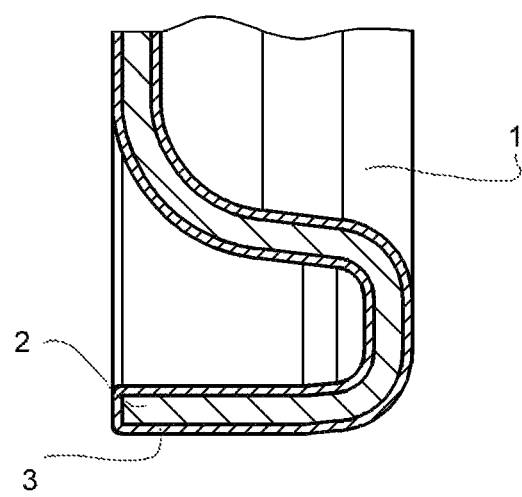
FIG. 3 is a cross-sectional view of a portion of the cap in FIG. 2 according to the present invention.

The rigid press-fit cap 1 used inside motor vehicles according to the present invention, as shown in FIG. 2 and in greater detail in FIG. 3, comprises a first metal layer 2 and at least a second layer 3 in contact with the first layer 2.

Advantageously, the second layer 3 comprises polyamide 11.

The polyamide 11 is a bio-polyamide 11 of vegetable origin derived from castor oil and is preferably obtained from renewable sources.

Preferably, the polyamide 11 is from the family sold under the Rilsan brand.

Even more advantageously, the second layer 3 is made for more than 50% in polyamide 11.

Even more advantageously, the second layer 3 is made for more than 80% in polyamide 11.

In a preferred embodiment, the second layer 3 is made entirely of polyamide 11.

Advantageously, the thickness of the first layer is between 0.5 mm and 2 mm. More preferably, the thickness of the first layer is between 0.75 mm and 1.5 mm.

Advantageously, the thickness of the second layer is between 0.15 mm and 0.3 mm. More preferably, the thickness of the second layer is between 0.2 mm and 0.30 mm.

More advantageously, the first layer 2 is made of a metal similar to that with which the crankcase or casing of an engine 4 is made.

More advantageously, the metal is steel or sheet metal, although it is also possible to use aluminium.

Figure 1:
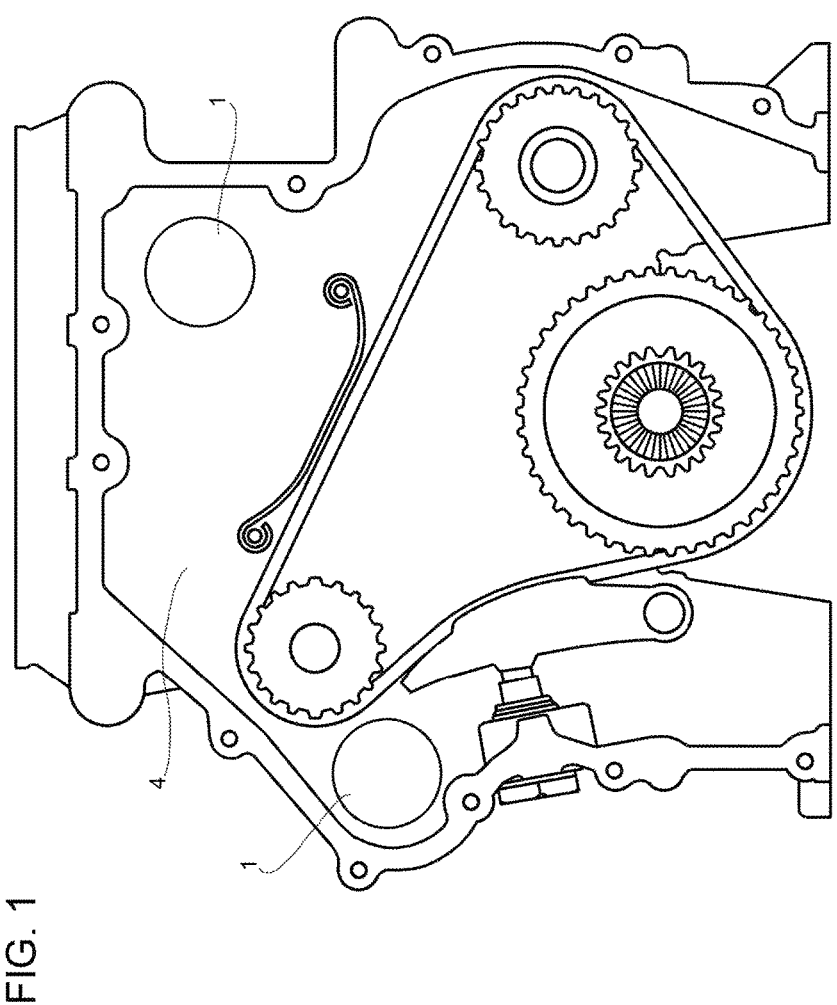
FIG. 1 is a partial, schematic view of an engine on which two caps according to the present invention are applied.

Advantageously, the cap 1 according to the present invention is used to close the crankcase, casing or cover of an engine 4 as schematically shown in FIG. 1, and in this application is also known as an engine cap. Alternatively, the cap of the present invention can also be used to seal the housing of the water pump, the oil pump or the gearbox.

The procedure of manufacturing a cap according to the present invention comprises the step of heating a preformed cap consisting of the first layer in a metal material to above 250° C. and then immersing the preformed cap in a vibrating drum full of polyamide 11.

In this way, the polyamide 11 melts and uniformly adheres to the walls of the first metal layer of the preformed cap, forming a second layer of uniform thickness.

The cap is then cooled.

Optionally, it is possible to reheat the cap to a lower temperature to obtain a gloss effect.

With this process, the second layer 3 entirely covers the first layer 2; alternatively, it is possible to cover just one side of the cap 1.

Advantageously, the cap 1 is press fitted in the assembly phase without interrupting the assembly line and without the need for further intermediate treatments, as in the case of caps used up to now.

Furthermore, it has also been found advantageous to use the caps of the present invention as replacements for screw-on caps, where the only modification is that the cap comprises a threaded portion suitable for screw-on applications.

The stability and oil resistance of the caps according to the present invention has been verified with an immersion test of 100 hours and 500 hours at 150° C. in a reference oil, Luprizol O5206304.

Caps with a glue covering did not pass the test and exhibited leakage risks, while caps according to the present invention, comprising two layers and in which the second layer comprises polyamide 11, never leaked nor exhibited even partial melting of the material.

From examination of the characteristics of the cap produced according to the present invention, the advantages it can provide are evident.

Advantageously, the caps according to the present invention have exhibited excellent resistance to high and low temperatures and to thermal shock.

Furthermore, the layer in polyamide 11 allows ensuring better sealing while, at the same time, the metal layer ensures the necessary rigidity.

The caps of the present invention are able to resist high pressures even exceeding 2 bar, support considerable thermal shock and resist to temperatures ranging from below −40° C. to 145-155° C. without risks of leakage.

Furthermore, the polyamide 11 used is a material of natural origin derived from castor oil and therefore comes from renewable sources and there is nowadays a continual quest for more eco-friendly materials for manufacturing motor vehicle parts.

While some embodiments have been described for the purposes of illustrating the invention, it is clear that a person skilled in the art may make changes to the materials of the first and the second layers of the cap or add layers without departing from the scope of the present invention.

The invention claimed is:

1. A rigid cap for a motor vehicle, said cap comprising;
   a first metal layer having a thickness between 0.5 mm and 2 mm; and
   at least a second layer comprising polyamide 11 in direct contact with said first metal layer, the second layer having a thickness between 0.15 mm and 0.3 mm,
   wherein the second layer entirely covers said first metal layer, which includes a first side, an opposing second side, and ends defined between the first side and the opposing second side of the first metal layer; and
   a press-fit feature providing for a hermetic seal;
   wherein the cap has an oil resistance verified by an immersion test of 100 hours to 500 hours in a reference oil having a temperature of 150° C. and the cap resists pressure at 2 bar without leaking fluid.

2. The cap according to claim 1, characterized in that said first layer is made of steel or aluminum.

3. The cap according to claim 1, characterized in that said second layer comprises at least 50% polyamide 11.

4. The cap according to claim 1, characterized in that said second layer comprises at least 80% polyamide 11.

5. The cap according to claim 1, characterized in that said second layer consists of polyamide 11.

6. The cap of claim 1, wherein the second layer entirely covers the first metal layer with a uniform thickness.

7. The cap of claim 6, wherein the second layer is formed by immersing the first layer in a container comprising therein a polyamide 11 after being heated.

8. Manufacturing method for a rigid cap for a motor vehicle comprising: heating a preformed cap formed by a first layer of metal material, the first layer having a thickness between 0.5 mm and 2 mm and having a press-fit feature, and subsequent to heating, immersing the preformed cap in a container filled with polyamide 11 to form a second layer entirely covering and in direct contact with the first layer of metal material; wherein the second layer has a thickness between 0.15 mm and 0.3 mm, the press-fit feature provides a hermetic seal, and the cap has an oil resistance verified by an immersion test of 100 hours to 500 hours in a reference oil having a temperature of 150° C. and the cap resists pressure at 2 bar without leaking fluid.

9. An engine comprising:
   a rigid cap as an engine cap or as part of the housing of a water pump, an oil pump, or a gearbox, said rigid cap comprising;
   a first metal layer having a thickness between 0.5 mm and 2 mm; and
   at least a second layer comprising polyamide 11 in direct contact with said first metal layer, the second layer having a thickness between 0.15 mm and 0.3 mm, wherein the second layer entirely covers the first metal layer, which includes a first side, an opposing second side, and ends defined between the first side and the opposing second side of the first metal layer; and
   a press-fit feature providing a hermetic seal to the engine, water pump, oil pump, or gearbox;
   wherein the cap has an oil resistance verified by an immersion test of 100 hours to 500 hours in a reference oil having a temperature of 150° C. and the cap resists pressure at 2 bar without leaking fluid.

10. The engine according to claim 9, wherein said first layer is made of steel or aluminum.

11. The engine according to claim 9, wherein said second layer comprises 50% to 100% polyamide 11.

12. The engine according to claim 9, wherein said second layer on at least one side of said first layer faces oil when installed in an engine.

\* \* \* \* \*